April 12, 1949.  E. A. GLYNN  2,467,125
DIE ASSEMBLY FOR SHAPING CURING RINGS
Filed April 14, 1947  3 Sheets-Sheet 1
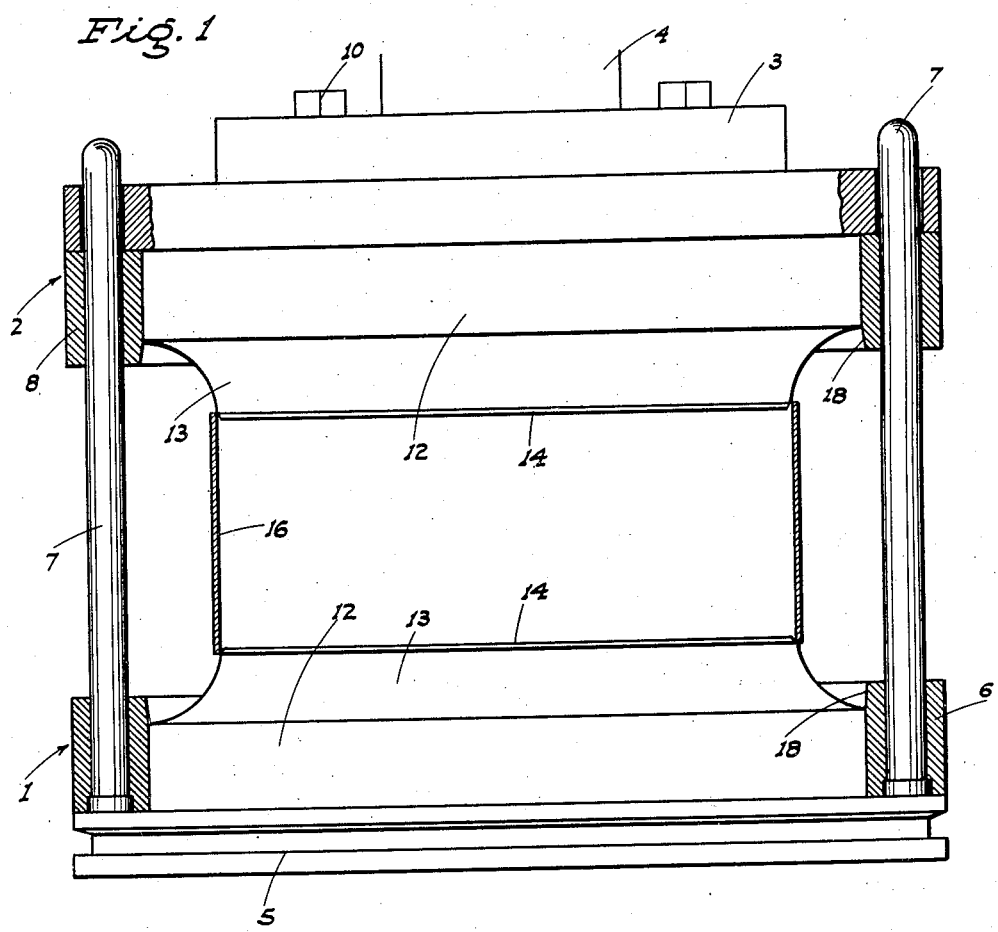
Fig. 1
Fig. 4
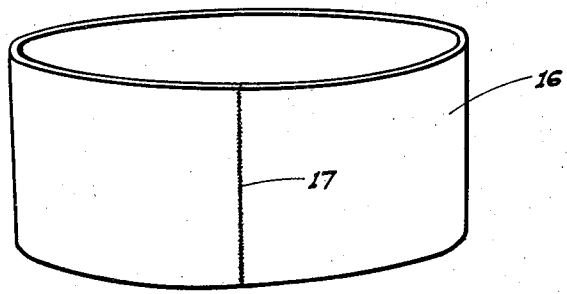
INVENTOR.
E. A. Glynn
BY
ATTYS April 12, 1949.　　　　E. A. GLYNN　　　　2,467,125
DIE ASSEMBLY FOR SHAPING CURING RINGS
Filed April 14, 1947　　　　　　　　　　3 Sheets-Sheet 2

INVENTOR.
E. A. Glynn
BY
ATTYS

April 12, 1949.   E. A. GLYNN   2,467,125
DIE ASSEMBLY FOR SHAPING CURING RINGS
Filed April 14, 1947   3 Sheets-Sheet 3
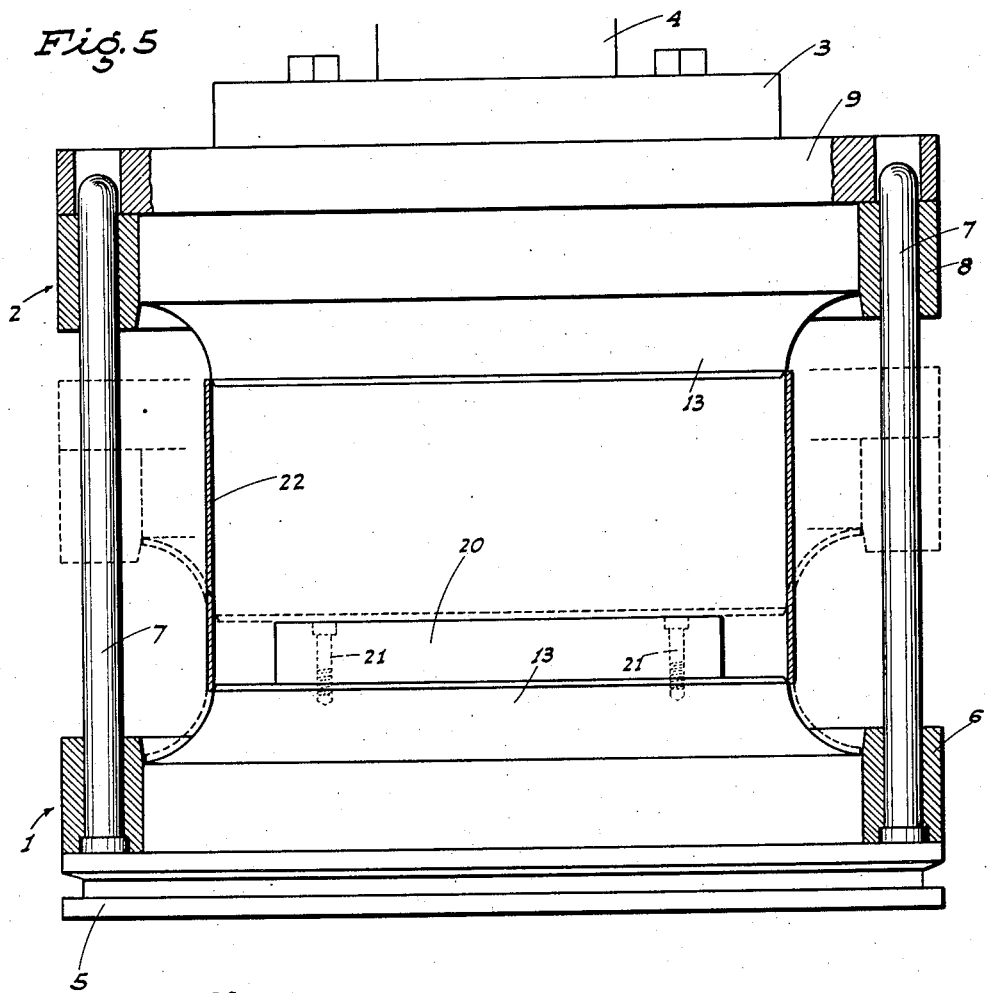
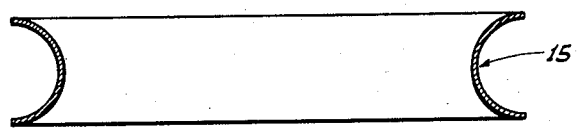
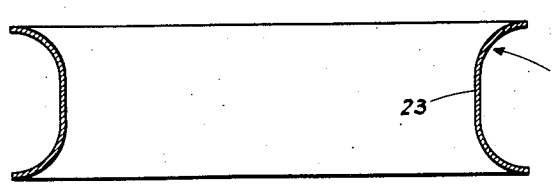
INVENTOR.
E. A. Glynn
BY
ATTYS Patented Apr. 12, 1949

2,467,125

UNITED STATES PATENT OFFICE 2,467,125

DIE ASSEMBLY FOR SHAPING CURING RINGS

Edwin A. Glynn, Lodi, Calif., assignor to Super Mold Corporation of California, Lodi, Calif., a corporation of California Application April 14, 1947, Serial No. 741,348

3 Claims. (Cl. 153—48)

An object of the invention is to provide a novel machine for shaping a curing rim of the type designed for use in tire recapping molds to support the annular curing bag on which the tire is carried in the mold.

An additional object of this invention is to provide a curing rim forming die assembly which is arranged so that rims of the same diameter but different widths can be manufactured in the same machine.

These objects are accomplished by means of such structure and relative arrangement of parts as will fully appear by a perusal of the following specification and claims.

In the drawings:

Fig. 1 is a side elevation, partly in section, of the die assembly in open or starting position.

Fig. 4 is a perspective view of one of the collars, from which the rim is formed, before the die or shaping operation thereon.

Fig. 5 is an elevation, partly in section, of the die assembly as arranged to form a rim of the same diameter, but of greater width, than when said assembly is used as in Fig. 1.

Fig. 6 is a cross sectional elevation of a rim formed in the die assembly, as in Fig. 1.

Fig. 7 is a cross sectional elevation of a rim formed in the die assembly, as in Fig. 5.

Figure 2:
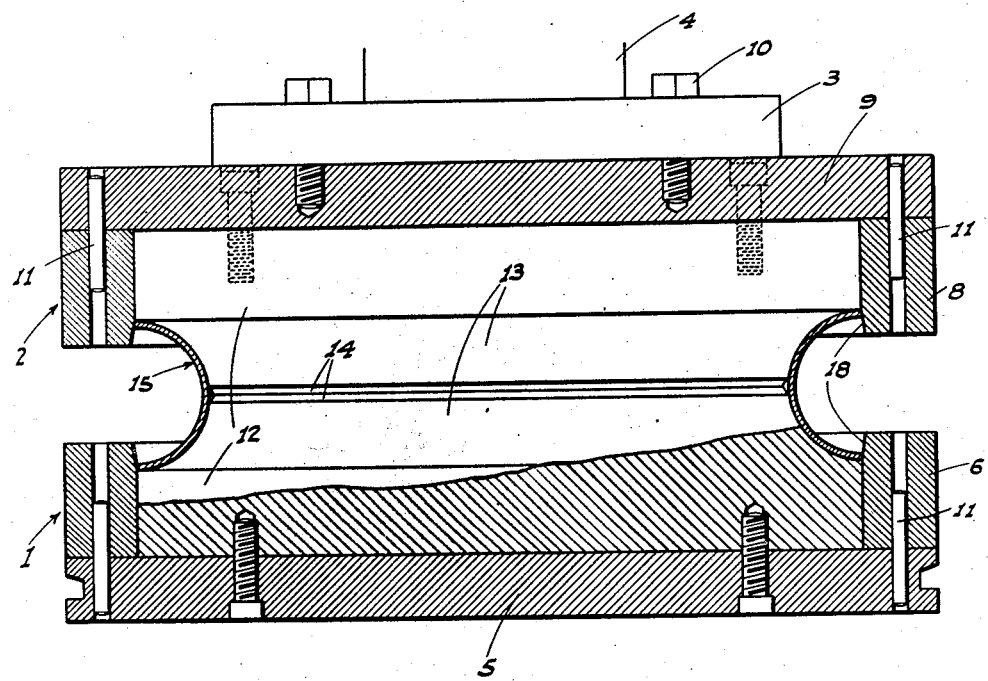
Fig. 2 is a similar view of the die assembly in closed position; i. e. of a rim forming operation.
Figure 3:
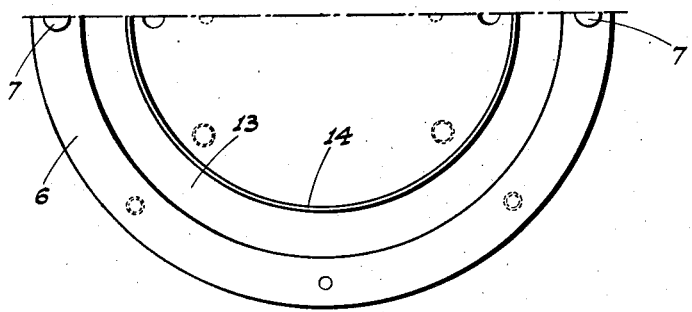
Fig. 3 is a half plan view of the lower die unit, detached.

Referring now more particularly to the characters of reference on the drawings, and at present to Figs. 1-4, inclusive, and 6, the die assembly comprises a lower die unit 1 adapted to seat on the base of a heavy-duty press. Above the lower die unit 1 is a vertically alined upper die unit 2 fixed in connection with the attachment flange 3 of the press plunger 4, whereby said upper die unit may be forcefully lowered relative to the lower die unit 1.

The lower die unit 1 includes a circular base plate 5 arranged to be secured on the base of the press; such plate including, at its periphery, a fixed upstanding carrier ring 6.

Guide posts 7 are fixed on opposite sides of the carrier ring 6 and project vertically upward through a complementary, carrier ring 8 fixed in connection with a circular head 9 at the periphery of the latter. The head 9 is attached concentrically to the flange 3 by cap screws 10.

The carrier rings 6 and 8 are located in proper position relative to the base plate 5 and circular head 9, respectively, by means of dowels 11. The carrier rings 6 and 8 are fitted therein with circular die blocks 12, including die necks 13 which project toward each other. The die necks are circular but taper from their inner to their outer ends, whereby said outer ends are of substantially lesser diameter. The peripheral face of each die neck 13 is its working face, which is concave, as shown, and approximately 90° in extent. At their outer ends the die necks 13 are chamfered, as at 14, to facilitate entry of the necks into the work, as hereinafter described; the outer or adjacent ends of said necks being substantially equal in diameter.

Each curing ring, a completed one of which is shown at 15 in Fig. 6, comprises an initially flat strip of relatively heavy sheet metal rolled into the form of a collar 16, as in Fig. 4, and adjacent ends of such rolled collar are welded together, as at 17. As so formed the outside of the collar 16 is machined smooth. The formed collar is placed in the die assembly, when the latter is open, in the manner shown in Fig. 1, with the die necks 13 at opposite ends of said collar. The chamfers 14 facilitate initial entry or penetration of said die necks 13 into opposite end portions of the collar 16.

With the collar thus positioned the press plunger 4 is forcefully power actuated in a downward direction, causing the die necks 13 to each penetrate half way into the collar 16 until such necks come into abutment, as shown in Fig. 2.

As the die necks 13 move toward each other the collar 16 is expanded by the concave working faces of said die necks to impart to the rim a substantially half-circle configuration, as shown in Fig. 6.

Over-expansion of the collar at the outer edges thereof is prevented by shoulders 18 formed by the carrier rings 6 and 8 projecting axially toward each other, i. e. into the radial plane of corresponding necks 13.

The shoulders 18 are relieved outwardly a slight amount, as shown, to prevent binding of a formed curing ring in the die assembly.

With the above described machine, and the method practiced therein, curing rings for tire recapping molds can be formed readily, quickly, accurately, and economically, as compared to any known or conventional practice. Further, the finished rings are smooth in surface, as is desirable, and have very great strength to withstand the operational pressures when used in a tire recapping mold. The curing rim, known to the trade as the inside curing rim, carries the air inflated curing bag, which in turn engages in the tire to forcefully impose the tread portion of the same in the curing mold.

When it is desired to form a wider curing rim, but of the same diameter, as shown generally at 19 in Fig. 7, the die assembly is arranged in the manner shown in Fig. 5, with a spacer block 20 attached to the outer end of one of the die necks by screws 21.

Here the initially formed collar 22 is somewhat wider than the collar 16, and with powered approaching motion of the upper die neck 13 toward the lower one thereof, said necks enter the wider collar 22 from opposite ends. However, the die necks 13 cannot come fully together by reason of the spacer block 20, and stop short of engagement. This results in the formation of the wider rim 19, with a flat portion 23 intermediate the curved edge portions, as is desirable in wider type rims.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A die assembly for shaping curing rims from metal collars initially flat transversely, comprising an upper die unit and a complementary lower die unit adapted to be mounted on opposed working parts of a power press, the lower die unit including a base plate and the upper die unit including a complementary head plate, vertically alined carrier rings mounted on adjacent faces of said plates and projecting toward each other, a circular die block in each carrier ring, die necks projecting toward each other from the die blocks and beyond the carrier rings, and said necks tapering from their inner toward their outer ends for entry into the collar from opposite ends, and expanding engagement thereof, upon approaching movement of said necks from open position of the die assembly; the carrier rings being of a width to project beyond corresponding die blocks in the same direction as the die necks project, so as to form annular stop shoulders.

2. A die assembly for shaping curing rims from metal collars initially flat transversely, comprising an upper die unit and a complementary lower die unit adapted to be mounted on opposed working parts of a power press, the lower die unit including a base plate and the upper die unit including a complementary head plate, vertically alined carrier rings mounted on adjacent faces of said plates and projecting toward each other, a circular die block in each carrier ring, die necks projecting toward each other from the die blocks and beyond the carrier rings, and said necks tapering from their inner toward their outer ends for entry into the collar from opposite ends, and expanding engagement thereof, upon approaching movement of said necks from open position of the die assembly; the carrier rings being of a width to project beyond corresponding die blocks in the same direction as the die necks project, so as to form annular stop shoulders, said stop shoulders being relieved laterally outwardly relative to the periphery of the inner ends of the die necks.

3. A die assembly for shaping curing rims from metal collars initially flat transversely, comprising an upper die unit and a complementary lower die unit adapted to be mounted on opposed working parts of a power press, the lower die unit including a base plate and the upper die unit including a complementary head plate, vertically alined carrier rings mounted on adjacent faces of said plates and projecting toward each other, a circular die block in each carrier ring, die necks projecting toward each other from the die blocks and beyond the carrier rings, and said necks tapering from their inner toward their outer ends for entry into the collar from opposite ends, and expanding engagement thereof, upon approaching movement of said necks from open position of the die assembly; there being a spacer adapted to be secured to the outer end of one die neck to limit approaching movement of said necks.

EDWIN A. GLYNN.

REFERENCES CITED

The following references are of record in the file of this patent:

UNITED STATES PATENTS

| Number | Name | Date |
| --- | --- | --- |
| 1,144,839 | Guenther | June 29, 1915 |
| 1,710,930 | Klaus | Apr. 30, 1929 |
| 2,139,833 | Le Jeune et al. | Dec. 13, 1938 |
| 2,159,900 | Le Jeune et al. | May 23, 1939 |
| 2,181,020 | Le Jeune | Nov. 21, 1939 |
| 2,291,393 | Le Jeune et al. | July 28, 1942 |
| 2,372,246 | Bacon, Jr. | Mar. 27, 1945 |
| 2,399,188 | Janiszewski | Apr. 30, 1946 |

FOREIGN PATENTS

| Number | Country | Date |
| --- | --- | --- |
| 23,142 | Great Britain | 1903 |